United States Patent
Nürnberg et al.

(10) Patent No.: US 9,554,510 B2
(45) Date of Patent: Jan. 31, 2017

(54) HEADER ASSEMBLY FOR A HARVESTER WITH A SECONDARY CUTTING AND PROCESSING MECHANISM

(75) Inventors: Alexander Nürnberg, Herdecke (DE); Wolfgang Oehler, Wipperfürth (DE); Didier O. M. Verhaeghe, Ieper (BE)

(73) Assignees: CNH Industrial America LLC, New Holland, PA (US); ESM Ennepetaler Schneid-und Mahtechnik GMBH, Ennepetal (DE)

( * ) Notice: Subject to any disclaimer, the term of this patent is extended or adjusted under 35 U.S.C. 154(b) by 81 days.

(21) Appl. No.: 14/233,646

(22) PCT Filed: Jul. 20, 2012

(86) PCT No.: PCT/EP2012/064352
§ 371 (c)(1),
(2), (4) Date: Jul. 14, 2014

(87) PCT Pub. No.: WO2013/011138
PCT Pub. Date: Jan. 24, 2013

(65) Prior Publication Data
US 2014/0319253 A1    Oct. 30, 2014

(30) Foreign Application Priority Data
Jul. 20, 2011 (GB) .................. 1112453.4

(51) Int. Cl.
*A01D 45/02*    (2006.01)
*A01D 43/08*    (2006.01)
(Continued)

(52) U.S. Cl.
CPC ......... *A01D 43/086* (2013.01); *A01D 34/8355* (2013.01); *A01D 41/14* (2013.01); *A01D 43/12* (2013.01); *A01D 47/00* (2013.01)

(58) Field of Classification Search
CPC .. A01D 34/8355; A01D 45/021; A01D 45/02; A01D 34/001; A01D 43/00; A01B 49/027; A01B 13/08; A01B 13/025; A01C 5/064; E02F 5/32
(Continued)

(56) References Cited

U.S. PATENT DOCUMENTS 1,429,163 A * 9/1922 Peden ................ A01D 34/8355
                                                    172/551
1,467,056 A    9/1923 Mix
(Continued)

FOREIGN PATENT DOCUMENTS

CN    101248722 A  *  8/2008  ............. A01D 45/02
CN    201119300 Y      9/2008
(Continued)

*Primary Examiner* — Árpád Fábián-Kovács
(74) *Attorney, Agent, or Firm* — Patrick M. Sheldrake

(57) ABSTRACT

A header assembly for a harvesting machine comprising a primary cutter head for cutting the crop, and a feeder for feeding the cut crop into the mouth of a crop processing mechanism. The assembly further comprises a secondary scissor-action cutter head trailing behind the primary cutter head for cutting stalks left behind by the primary cutter head, the secondary cutter head coupled to the rear of the header and supported by ground engaging rollers. The rollers include at least one support cylinder having a circumferentially discontinuous ground engaging outer surface operative to perform a preliminary processing of at least one of the crop residue and the soil.

17 Claims, 4 Drawing Sheets

(51) Int. Cl.
*A01D 34/835* (2006.01)
*A01D 41/14* (2006.01)
*A01D 47/00* (2006.01)
*A01D 43/12* (2006.01)

(58) Field of Classification Search
USPC ........ 56/52, 238, 9, 504; 172/146, 150, 170, 172/177, 142, 144, 149, 151, 180; 111/140
See application file for complete search history.

(56) References Cited

U.S. PATENT DOCUMENTS

| | | | |
|---|---|---|---|
| 1,589,371 A | 6/1926 | Virgil | |
| 1,757,873 A | 5/1930 | Franklin | |
| 1,884,803 A * | 10/1932 | Miller | A01B 29/041 172/154 |
| 2,204,569 A * | 6/1940 | Bushong | A01B 17/004 172/151 |
| 2,401,513 A | 6/1946 | Schmidt | |
| 2,515,556 A | 7/1950 | Hartling | |
| 2,697,903 A | 12/1954 | McKay | |
| 3,984,966 A * | 10/1976 | Outtier | A01D 45/021 56/10.2 R |
| 4,144,698 A * | 3/1979 | Shelton | A01D 65/08 56/1 |
| 4,212,254 A * | 7/1980 | Zumbahlen | A01C 7/00 111/144 |
| 4,723,397 A | 2/1988 | Matton | |
| 4,875,331 A | 10/1989 | Ostrup et al. | |
| 4,932,477 A * | 6/1990 | Atwood | A01B 29/043 172/519 |
| 5,036,655 A * | 8/1991 | Holloway | A01B 45/026 172/21 |
| 5,433,065 A * | 7/1995 | Mosby | A01D 41/14 56/13.9 |
| 5,622,227 A * | 4/1997 | McDonald | A01B 49/027 172/146 |
| 5,725,057 A * | 3/1998 | Taylor | A01B 29/04 172/121 |
| 6,068,061 A | 5/2000 | Smith et al. | |
| 6,675,568 B2 | 1/2004 | Patterson et al. | |
| 6,761,120 B2 * | 7/2004 | Kovach | A01B 13/08 111/140 |
| 6,763,896 B1 * | 7/2004 | Hurtis | A01B 29/048 172/144 |
| 7,156,186 B2 * | 1/2007 | Knobloch | A01B 49/027 172/540 |
| 7,373,768 B2 * | 5/2008 | Sugden | A01D 43/00 56/249 |
| 7,730,961 B2 * | 6/2010 | Ward | A01B 29/04 172/21 |
| 7,874,135 B2 * | 1/2011 | Nagy | A01D 45/021 56/504 |
| 7,886,511 B2 | 2/2011 | Honas et al. | |
| 8,171,707 B2 | 5/2012 | Kitchel | |
| 8,220,236 B1 | 7/2012 | Benner et al. | |
| 8,727,033 B2 * | 5/2014 | Kovach | A01B 29/06 172/150 |
| 8,939,095 B2 * | 1/2015 | Freed | A01B 49/027 111/164 |
| 2002/0112461 A1 * | 8/2002 | Burk | A01D 34/8355 56/504 |
| 2009/0032274 A1 | 2/2009 | Pitonyak | |
| 2010/0205922 A1 | 8/2010 | Pierson | |
| 2011/0179758 A1 * | 7/2011 | Kitchel | A01D 45/02 56/52 |
| 2014/0311115 A1 * | 10/2014 | Verhaeghe | A01D 34/8355 56/251 |

FOREIGN PATENT DOCUMENTS

| | | | | |
|---|---|---|---|---|
| CN | 201191993 Y | 2/2009 | | |
| CN | 201243487 Y | 5/2009 | | |
| CN | 201860585 U | 6/2011 | | |
| DE | 3713025 A1 * | 10/1988 | | A01D 43/082 |
| DE | 102005025319 | 12/2006 | | |
| EP | 0212185 | 3/1987 | | |
| EP | 1483953 | 12/2004 | | |
| FR | 2730126 A1 | 8/1996 | | |
| GB | 2023392 A | 1/1980 | | |
| JP | 2004097078 A | 4/2004 | | |
| RU | 2192117 C2 | 11/2002 | | |
| WO | 03090516 A2 | 11/2003 | | |

* cited by examiner

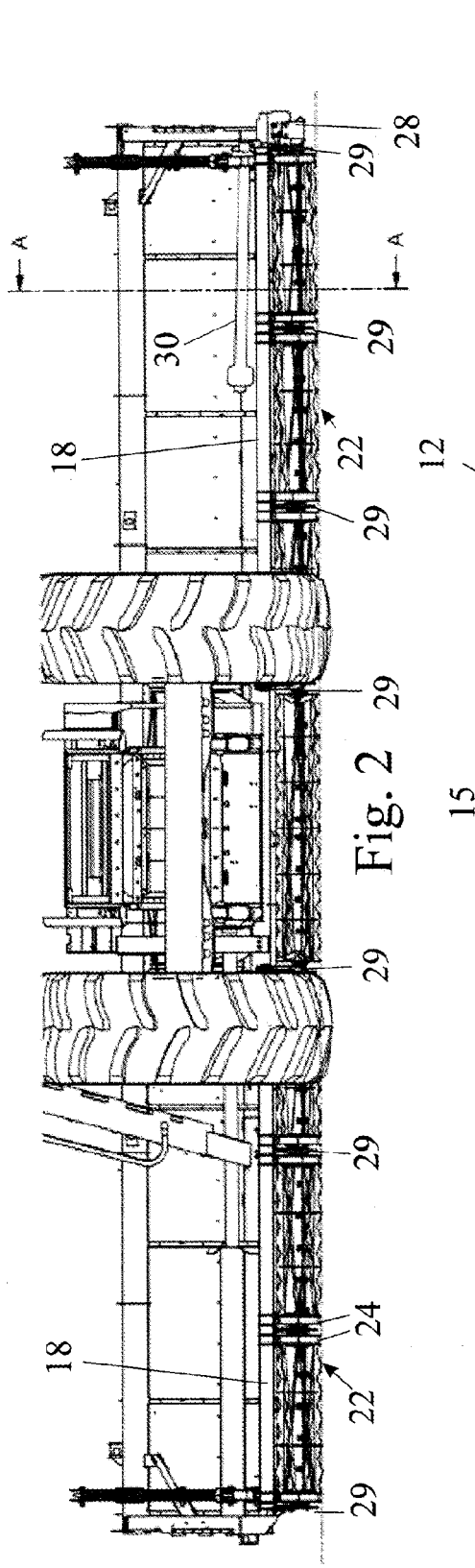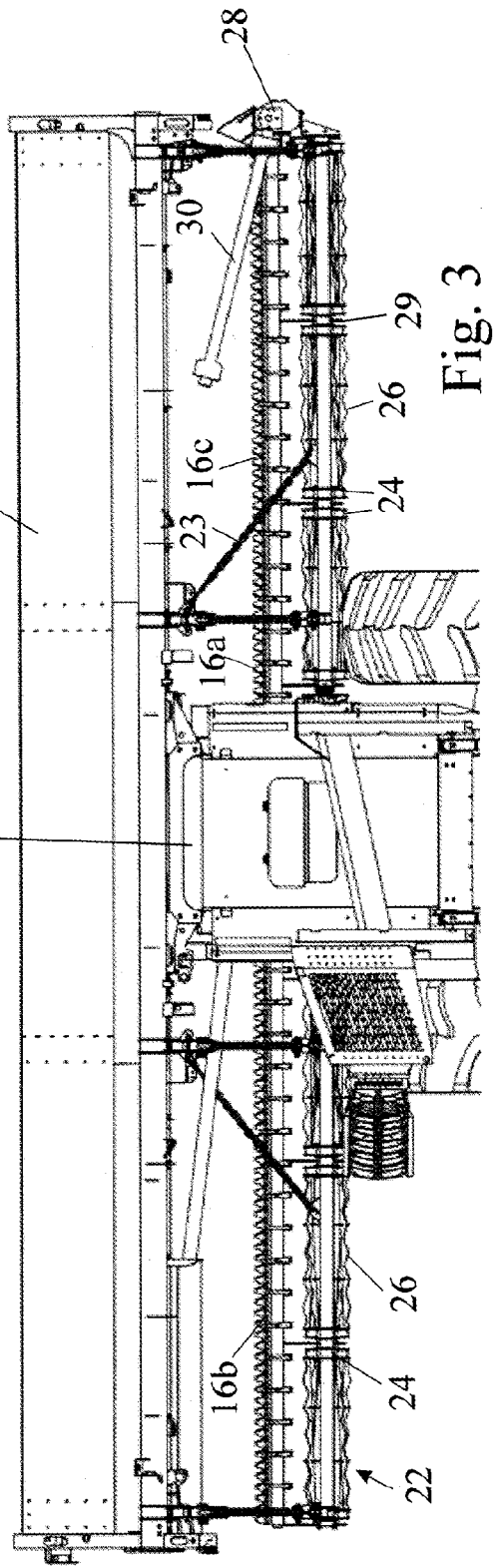

HEADER ASSEMBLY FOR A HARVESTER WITH A SECONDARY CUTTING AND PROCESSING MECHANISM

This application is the US National Stage filing of International Application Serial No. PCT/EP2012/064352 filed on Jul. 20, 2012 which claims priority to Great Britain Application GB1112453.4 filed Jul. 20, 2011, each of which is incorporated herein by reference in its entirety.

FIELD OF THE INVENTION

The present invention relates to header assembly for a harvesting machine, such as a combine or forage harvester.

BACKGROUND OF THE INVENTION

Conventional combine and forage harvesters have a header assembly for harvesting crop from a field and feeding it into a processing mechanism. For crops such as barley, rye, oats and wheat, the header assembly usually comprises a header having a primary cutter head that cuts the crop, and a reel and two lateral augers that draw the cut crop into a central feeder (also known as a straw elevator). The augers drive the crop from the ends of the header towards the feeder which then raises the crop into the mouth or infeed of the crop processing mechanism of the harvester.

In a combine harvester, the processing mechanism may typically comprise a threshing cylinder for separating the grain from the straw and the chaff. After the crop has been threshed, the grain passes over oscillating sieves that separate it from the chaff and it is stored in a grain tank. The straw on the other hand is transported by straw walkers or a separating cylinder to the rear of the harvester where it is either chopped and dispersed with the chaff or laid down in swaths or windrows for later baling.

It is known from U.S. Pat. No. 2,401,513 and EP 0 212 185 for a header assembly for a harvester having a header as described above to be provided with a secondary scissor-action cutter head mounted on a support frame trailed behind the primary cutter head for cutting stalks left behind by the primary cutter head. The secondary cutter head may be supported by ground engaging rollers or skids.

OBJECT OF THE INVENTION

The present invention seeks to simplify the tasks that need to be performed to prepare the ground after completion of the harvesting operation when using a header assembly of the kind having two cutter heads.

SUMMARY OF THE INVENTION

According to the present invention, there is provided a header assembly for a harvester having a header comprising a primary cutter head for cutting the crop and conveying the cut crop into a feeder for feeding the cut crop into the mouth of a crop processing mechanism, and further comprising a secondary scissor-action cutter head trailing behind the primary cutter head for cutting stalks left standing by the primary cutter head, the secondary cutter head being coupled to the rear of the header and supported by ground engaging roller assemblies, characterised in that the roller assemblies include at least one support cylinder having a circumferentially discontinuous ground engaging outer surface operative to perform a preliminary processing of at least one of the crop residue and the soil.

Preferably the support cylinders extend substantially the full cutting width of the secondary cutting head.

In an embodiment of the invention, each support cylinder has a plurality of blades that extend generally axially and are spaced from one another circumferentially, traction between the support cylinder and the ground being achieved by the radially outer edges of the blades penetrating into the ground.

Though the blades may extend parallel to the axis of the cylinder, it is preferred for them to be skewed so as to follow a helical path.

To assist in penetration into the ground, the radially outer edges of the blades may be toothed.

The teeth may conveniently be symmetrical triangles with an obtuse angle at their tips.

While it would be possible for the support cylinders to be powered, it suffices for them to be turned by ground traction.

The support cylinder in an embodiment of the invention comprises a plurality of axially spaced disks to which the blades are secured.

Though the blades may be permanently secured to the spaced disks, for example by welding, it is alternatively possible for them to be removable or interchangeable.

As a single rigid secondary cutter head extending over the full width of the header would only be suitable for perfectly flat ground, in an embodiment of the invention, the secondary cutter is supported by a plurality of mutually articulated ground engaging support cylinders.

While the separate support cylinders need not be coupled for rotation in synchronism with one another, it is necessary either to provide a single flexible scissor-action cutter head or to form the cutter head from separate sections that are flexibly coupled to one another. In either case, the secondary cutter head is actuated across the entire width of the header assembly by means of a single wobble box arranged at one end of the header assembly.

In operation of a header assembly of the invention, the part of the stalks of the crop bearing the grain is severed from the ground by the primary cutter head and is processed in a conventional manner. By reducing the volume of crop material other than grain entering the processing mechanism, the efficiency of the harvester is improved.

The lower parts of the stalks left behind by the primary cutter head are trimmed closer to the ground by the secondary cutter head leaving behind only a very short stubble. Hitherto, the cut stalks were merely left on the ground, mostly on top of the stubble. By virtue of the design of the support cylinders described above, these cut stalks are captured by the rotating blades and compressed into the short stubble remaining on the ground so that they remain in place after passage of the combine harvester. The action of the blades penetrating into the ground also assists in ploughing the shorter stalks into the ground.

In a development of the invention, frames supporting sections of the secondary cutter head may be used to support ancillary tools for further crop residue processing and/or soil processing.

Embodiments of the invention allow several improvements to be achieved over conventional header assemblies. In particular:

- because the preparation of the ground is carried out at the same moment as the crop harvesting, expenditure on both materials and time for preparation of the ground is reduced,
- the dependency on the weather is avoided as conditions suitable for crop harvesting are also suitable for distribution of the shorter stalks and light tilling, the working of the short stalks into the ground creates a mat that reduces the germination time of lost grain. Any grains that will have germinated by the time the field is ploughed for the next season will then be destroyed by the ploughing operation.

a straw distribution that is fit for drying is achieved over the entire width of the header, with less likelihood of straw nests being created by the action of wind.

BRIEF DESCRIPTION OF THE DRAWINGS

The invention will now be described further, by way of example, with reference to the accompanying drawings, in which:

FIG. 2 is a rear view of the header assembly shown in FIG. 1;

FIG. 3 is a plan view from above of the header assembly shown in FIGS. 1 and 2;

DETAILED DESCRIPTION OF THE PREFERRED EMBODIMENT

Figure 1:
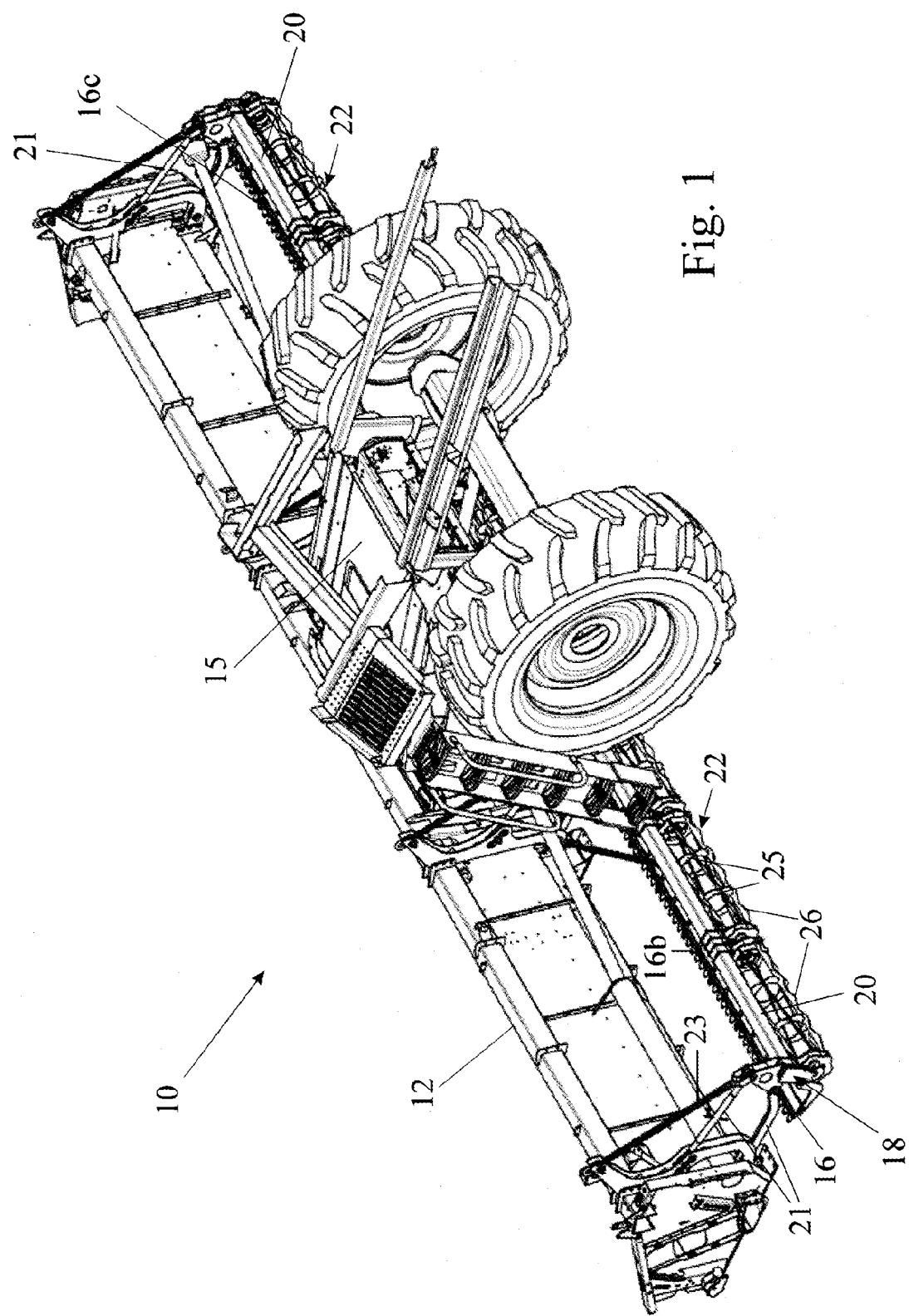
FIG. 1 is a rear perspective view of a header assembly embodying the invention for use in a combine harvester.

The header assembly 10 shown in the drawings comprises a header 12 which will not be described herein in detail as it is generally conventional. A scissor-action cutter 14 is provided at the leading edge of the header 12 and behind it there are mounted a reel and lateral augers (not shown) that advance the crop onto a feeder 15, which is attached for rotation about a transverse axis to the frame of the harvester. From the feeder 15, the crop passes into the processing mechanism of the harvester.

A secondary scissor-action cutter head 16 is provided that trails behind the header 12. The secondary cutter head 16 is a flexible cutter head that extends over the entire width of the header assembly 10 and comprises three separately supported sections, namely a central section 16a disposed beneath the feeder 15 and two lateral sections 16b and 16c.

The lateral sections 16b and 16c of the secondary cutter head 16 are mounted to independent left and right hand support frames 18, which each comprise a cross beam 20 that is arranged generally parallel to the cutter head 16 and has an inner end that stops short of the feeder 15. The cross beams 20 are connected to the header 12 by two pairs of arms 21. The geometry of the arms 21 is such that the cutter head 16 remains horizontal as its height relative to the header changes. The support frames 18 are also connected to the header by chains 23 that are slack when the harvester is in operation but which serve to raise the support frames 18 of the secondary cutter 16 off the ground when the header is raised to a transport position.

Figure 5:
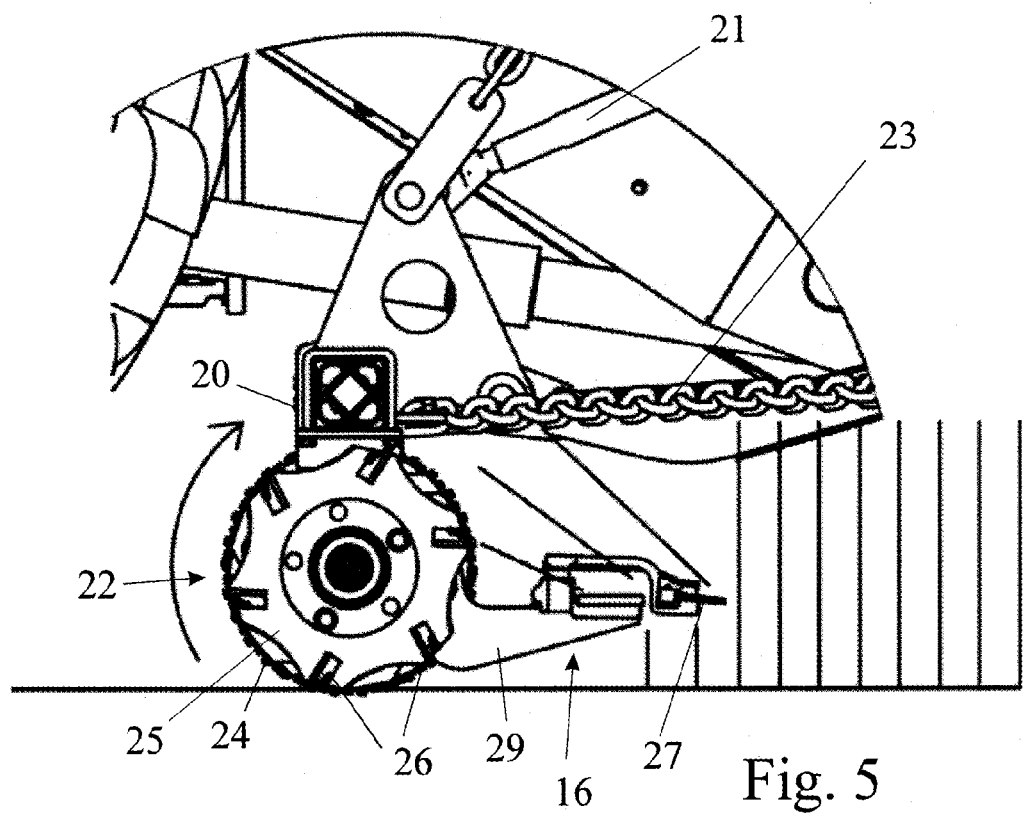
FIG. 5 is a view of the detail of FIG. 5 contained within the circle V, drawn to an enlarged scale.

Each of the two support frames 18 rests on roller assemblies, comprising narrow rollers 24, between which wide rollers 22 of cylindrical cage construction are mounted. The narrow rollers 24 are rotatably connected to angled plates that are secured by pairs of braces to the cross beams 20 (FIG. 5). The cage construction rollers 22 comprise axially spaced disks 25 and helically skewed blades 26 permanently or removable secured to the outer perimeter of the disks 25. The cage rollers 22 are removably connected to the narrow rollers 24 by bolts extendings through holes in the end disks 25 and the narrow rollers 24. In an alternative embodiment, no narrow rollers may be used and the roller assemblies only comprise removable cages, constituted by side disks and blades, the cage being directly connectable to journals that are connected to the support frames 18. As best seen in FIG. 3, the blades 26 have toothed radially outer edges, the teeth being symmetrical triangles with an obtuse angle at their tips. The roller assemblies are arranged next to each to cover the full width of the secondary cutter head 16, not only behind the lateral sections 16b, 16c, but also behind the central section 16a, below the feeder 15.

The cutter head 16 comprises a flexible cutter bar 27, comprising two long oscillating blades, each extending over the entire width of the header assembly 10. Both blades are connected to a wobble box 28 that uses the rotation of an eccentric crank to cause the oscillating blades of the cutter bar to reciprocate in counter phase. Such design minimizes operational vibration and prevents build-up of material or clogging in front of the secondary cutter head 16. The wobble box 28 is powered by an input shaft 30 that is also shown in FIG. 3. The input shaft 30 may be driven by a drive shaft on the header 12 or on the feeder 15. The cutter bar 27 is attached to a set of support arms 29 that extend downwardly and forwardly from the left and right beams 20. These support arms 29 are connected to the angled plates that also hold the journals of the cylindrical rollers 22. These arms are adjustable in vertical and horizontal directions to change the height and forward position of the cutter bar 27.

In an alternative embodiment the secondary cutter head 16 may comprise a single blade, having knife sections which are reciprocated between stationary, forwardly extending fingers. Such cutter head is less complex, but is more prone to build-up of stalks at the front thereof.

The central section 16a of the cutter head 16, underneath the feeder 15, differs from the lateral sections 16b and 16c in that its support structure does not include a cross beam 20 or support arms 29. The reason for this is that, in the lower position of the header assembly 10, there is not sufficient clearance under the feeder 15 to accommodate such a beam. Instead, the central section of the cutter bar 27 is only supported by the support arms 29 adjacent the innermost ends of the left and right cross beams 20. The adjacent cage construction roller 22 is journalled on two downwardly extending arms resiliently coupled to the cross beams 20 of the two lateral support frames 18. In this way, the axes of the different rollers 22 can be inclined to one another to accommodate any curvature in ground.

Figure 4:
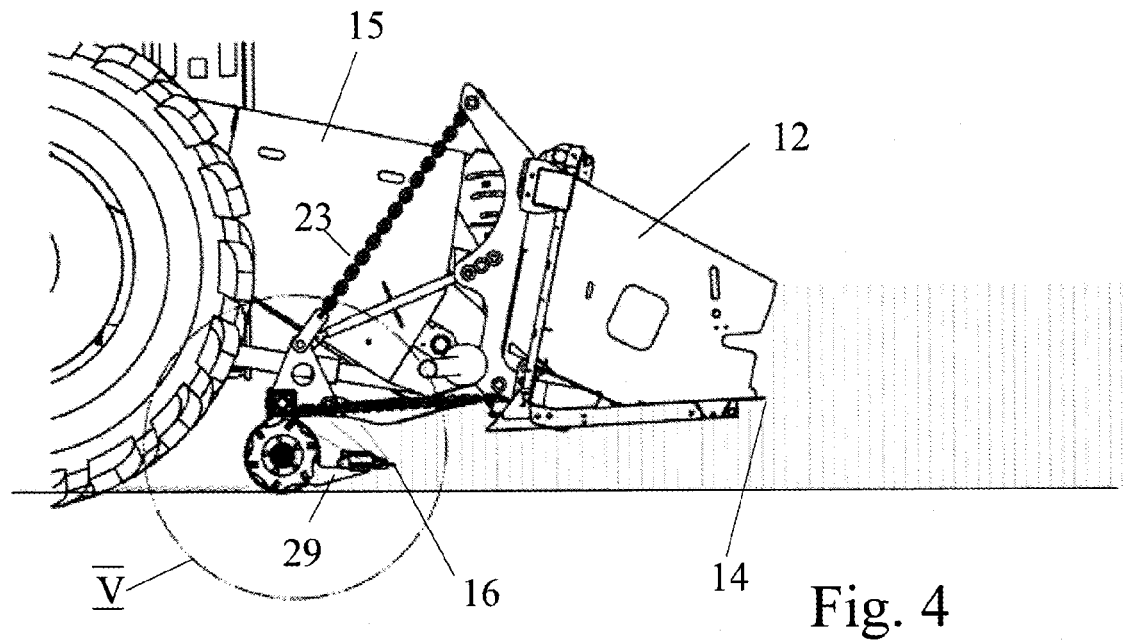
FIG. 4 is a section along the line A-A in FIG. 2 showing the relative positions of the primary and secondary cutter heads during operation.

The operation of the header assembly is best understood from FIG. 4. The height of the header 12 is set such that the primary cutter head 14 is at a height of the above ground sufficient to sever the ears holding the grain, while leaving shortened stalks standing. The upper part of the crop, consisting of the ears and part of the stalks, is processed in the usual manner, which need not be described further in the present context.

In the absence of an integrated secondary cutting operation, as realised by a secondary cutter head, the lower part of the stalks remaining on the ground would need to be removed in a separate operation. The provision of a secondary cutter head 16, however, allows the crop to be cut a second time closer to the ground. As the secondary cutter head has some flexibility, it also allows a uniform stubble height to remain across the width of the header assembly.

Hitherto, the short stalks produced by the secondary cutter head were allowed to rest on the ground, to be subsequently ploughed into the ground during preparation of the field for the next crop. During the intervening period, the weather could change and the stalks could be dispersed unevenly by the wind.

By contrast, in the described and illustrated embodiment of the invention, the cage construction rollers 22 are designed to perform preliminary processing of the crop residue at the same time as the harvesting. In particular, the paddle-like blades 26 serve to catch the cut stalks and to compress them into the stubble remaining on the ground. Furthermore, the blades 26 tend to penetrate into the ground so at to push the cut stalks into the ground thereby preventing from being dispersed by wind. Instead of loose straw strewn unevenly on the ground, the harvester leaves behind an even mat-like covering that also acts to reduce the germination time of any waste grain discharged from the harvester.

The discontinuous surface of the cage rollers 22 and their rotation during harvest operations also prevents build-up of stalks in front of and behind the cutter bar 27. The blades 26 rotate to engage and grab the top ends of the trimmed stalks and pull these rearwardly over the cutter bar 27. The blades then continue to push the stalks in the trimmed stubble and into the ground.

Figure 6:
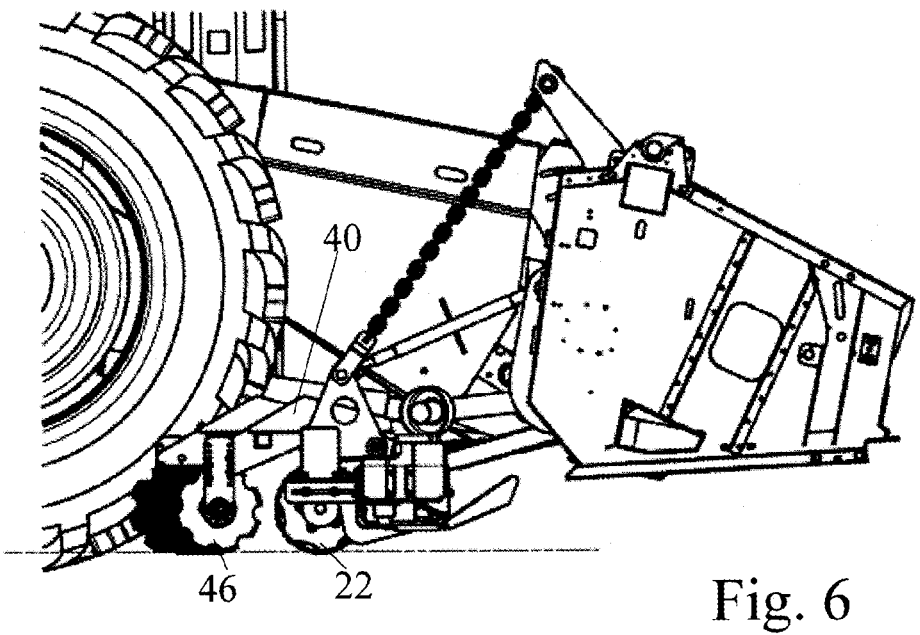
FIG. 6 is a view of a header assembly embodying the invention and further provided with a tillage implement.
Figure 7:
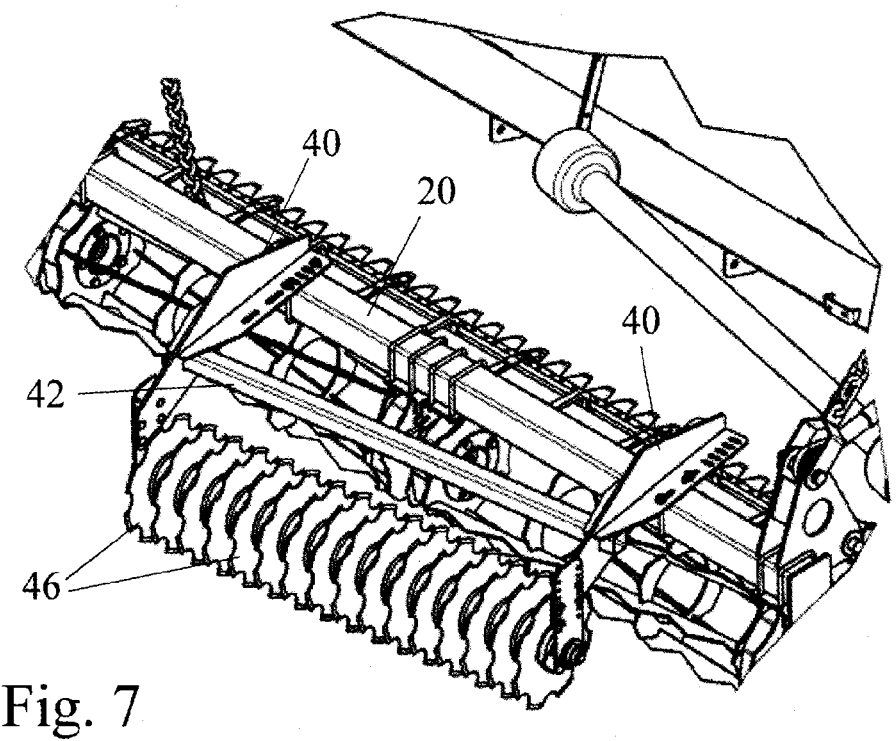
FIG. 7 is a rear perspective view of the header assembly shown in FIG. 6.

As shown in FIGS. 6 and 7, the cross beams 20 may serve as a means of attachment for crop residue or soil processing implements, so that further working of the crop residue or aeration and tilling of the ground may be carried out at the same time as the harvesting.

In FIGS. 6 and 7, two brackets 40 are secured to the cross beam 20 and are interconnected by a reinforcement cross bar 42. This structure serves to support a shaft carrying a set of axially spaced toothed disks 46 with their planes inclined relative to the direction travel. The disks 46 act as a tillage implement to turn the top layer of the soil and further work the crop residue into the soil.

It should be added that the described tillage implement comprising the disks 46 is itself a cylinder with a discontinuous surface and it may be used in place of the cage roller 22 to support the weight of the support frame 18 and the cutter bar 16. In such an embodiment, stationary stalk deflector blades may be mounted on the frame 18 between the cutter bar 16 and the tillage implement to deflect the cut stalks from their vertical attitude, so that they may then be worked into the soil by the tillage implement.

As a further option, it may of interest to remove the cage rollers 22, and to support the secondary cutter head only by means of the narrow rollers 24. This arrangement minimizes the contact with the stalks after cutting and leaves most of them on top of the stubble, which is a proper position for subsequent picking up and processing by a baler. As an alternative, the narrow rollers need not to rest on the ground, but may be provided with wheels, which can be connected at the places where the cage rollers were attached first.

The invention claimed is:

1. A header assembly for a harvester, comprising:
a primary cutter head for cutting and conveying crop into a feeder configured for feeding the crop into the mouth of a crop processing mechanism; and
a secondary scissor-action cutter head trailing behind the primary cutter head for cutting stalks left standing by the primary cutter head, the secondary cutter head supported by ground engaging roller assemblies;
wherein the roller assemblies include at least one support cylinder having a circumferentially discontinuous ground engaging outer surface operative to perform a preliminary processing of at least one of crop residue and soil, and wherein the at least one support cylinder has a plurality of blades that extend generally axially and are spaced from one another circumferentially, said at least one support cylinder comprising a plurality of axially spaced disks to which the blades are secured.

2. A header assembly according to claim 1, wherein the at least one support cylinder extends substantially the full cutting width of the secondary cutter head.

3. A header assembly according to claim 1, wherein the blades are skewed to follow a helical path.

4. A header assembly according to claim 1, wherein the radially outer edges of the blades are operable to penetrate into the ground.

5. A header assembly according to claim 4, wherein, the radially outer edges of the blades are toothed.

6. A header assembly according to claim 5, wherein the teeth are symmetrical triangles with an obtuse angle at their tips.

7. A header assembly according to claim 1, wherein the blades are removable from the disks.

8. A header assembly according to claim 1, wherein each support cylinder serves as a tillage implement and comprises a plurality of spaced disks mounted on a common shaft.

9. A header assembly according to claim 8, wherein the planes of the disks are inclined relative to the direction of travel of the header.

10. A header assembly according to claim 1, wherein the at least one support cylinder is not powered and are rotated by traction with the ground.

11. A header assembly according to claim 1, wherein the at least one support cylinder is arranged behind the secondary cutter head, at a distance not exceeding the length of stalks of uncut crop.

12. A header assembly according to claim 1, wherein the secondary cutter head is supported by a plurality of mutually articulated ground engaging support cylinders.

13. A header assembly according to claim 12, wherein the secondary cutter head is formed by a single flexible scissor-action cutter bar.

14. A header assembly according to claim 12, wherein the secondary cutter head comprises distinct sections supported by frames that are flexibly coupled to one another.

15. A header assembly according to claim 14, wherein at least some sections of the secondary cutter head are supported on frames that include a reinforcing cross beam above the roller assemblies.

16. A header assembly according to claim 15, wherein the cross beam includes a connection for an agricultural implement, the agricultural implement operable to further process at least one of the crop residue and the soil.

17. A header assembly according to claim 1, wherein the ground engaging roller assemblies further include narrow rollers, between which the at least one support cylinder is arranged, the narrow rollers being operable to support the secondary cutting means after removal of the at least one support cylinder.

* * * * *